(12) United States Patent
Farahmandpour (10) Patent No.: US 9,447,584 B2
(45) Date of Patent: Sep. 20, 2016

(54) FAÇADE WALL ATTACHMENT DEVICE

(71) Applicant: Kamran Farahmandpour, Long Grove, IL (US)

(72) Inventor: Kamran Farahmandpour, Long Grove, IL (US)

(*) Notice: Subject to any disclaimer, the term of this patent is extended or adjusted under 35 U.S.C. 154(b) by 0 days.

(21) Appl. No.: 14/451,952

(22) Filed: Aug. 5, 2014

(65) Prior Publication Data

US 2016/0040425 A1 Feb. 11, 2016

(51) Int. Cl.
| | |
|---|---|
| *E04H 1/00* | (2006.01) |
| *E04F 13/04* | (2006.01) |
| *E04B 1/74* | (2006.01) |
| *E04B 9/00* | (2006.01) |
| *E04F 13/00* | (2006.01) |
| *E04F 19/06* | (2006.01) |
| *F16B 5/00* | (2006.01) |
| *E04D 3/08* | (2006.01) |

(52) U.S. Cl.
CPC ............... *E04F 13/00* (2013.01); *E04F 19/06* (2013.01); *E04D 2003/085* (2013.01); *F16B 5/0068* (2013.01)

(58) Field of Classification Search
CPC .................. E04D 2003/085; E04D 2003/285; E04F 19/06; E04F 19/065; E04F 13/00; F16B 5/0068; F16B 5/123; E04B 9/242; E04B 9/0435; E04B 9/26; E06B 2003/6223
USPC ........... 52/235, 345, 407.4, 476, 489.2, 765, 52/769, 775, 761, 512, 709, 706, 582.2, 52/591.2, 770-773
See application file for complete search history.

(56) References Cited

U.S. PATENT DOCUMENTS

| | | | | |
|---|---|---|---|---|
| 2,073,278 | A | * | 3/1937 | Hohl .................... E04F 19/06 16/16 |
| 3,688,460 | A | * | 9/1972 | Van Loghem et al. ......... 52/466 |
| 3,760,544 | A | | 9/1973 | Hawes et al. |
| 4,067,155 | A | * | 1/1978 | Ruff .................... E04B 1/6803 4/498 |
| 4,222,210 | A | * | 9/1980 | Hanstein et al. .............. 52/461 |
| 4,385,850 | A | * | 5/1983 | Bobath ........................ 403/205 |
| 4,462,194 | A | | 7/1984 | Wahner |
| 4,541,211 | A | | 9/1985 | Garrett |
| 4,597,702 | A | | 7/1986 | Brown |
| 4,707,894 | A | * | 11/1987 | Friedwald ...................... 24/459 |
| 4,858,408 | A | * | 8/1989 | Dunn ........................ 52/506.07 |
| 4,891,920 | A | * | 1/1990 | Pingston ........................ 52/145 |
| 5,207,043 | A | | 5/1993 | McGee et al. |
| 5,299,403 | A | | 4/1994 | Fentz |

(Continued)

FOREIGN PATENT DOCUMENTS

| | | |
|---|---|---|
| EP | 0854245 B1 | 11/2001 |
| GB | 2069564 | 8/1981 |

*Primary Examiner* — Brian Glessner
*Assistant Examiner* — Omar Hijaz
(74) *Attorney, Agent, or Firm* — Erickson Law Group, PC (57) ABSTRACT

A facade attachment device for connecting an exterior façade wall to a support wall. The base has an elongated member extending transversely from a mounting plate. The elongated member has a plurality of teeth. The retainer has an insulation engaging portion, a facade attachment portion, and a receiving passage. The receiving passage is sized to receive the elongated member. The receiving passage extends through the insulation engaging portion. The retainer has a ratcheting mechanism. The ratcheting mechanism comprises a locking member engageable with at least one of the plurality of teeth of the elongated member to prevent retainer from moving in at least one direction. The façade attachment portion is configured to receive a connection with the façade wall.

20 Claims, 10 Drawing Sheets

(56) References Cited

U.S. PATENT DOCUMENTS

| | | | |
|---|---|---|---|
| 5,426,905 A | 6/1995 | Rollhauser et al. | |
| 5,549,266 A | 8/1996 | Mitchell et al. | |
| 5,611,184 A | 3/1997 | Felix | |
| 5,611,185 A * | 3/1997 | Wilz | 52/506.07 |
| 5,634,310 A | 6/1997 | Hohmann | |
| 5,660,015 A | 8/1997 | Kluser | |
| 5,671,576 A | 9/1997 | Kluser | |
| 5,675,942 A | 10/1997 | Crawford | |
| 5,678,383 A * | 10/1997 | Danielewicz | 52/775 |
| 5,987,830 A | 11/1999 | Worley | |
| 6,131,360 A | 10/2000 | Dalen | |
| 6,212,841 B1 | 4/2001 | Plume | |
| 6,263,631 B1 | 7/2001 | Nisbett et al. | |
| 6,314,694 B1 | 11/2001 | Cooper | |
| 6,347,435 B1 * | 2/2002 | Davignon | B65D 63/1063 24/16 PB |
| 6,609,340 B2 | 8/2003 | Moore, Jr. et al. | |
| 6,711,870 B1 * | 3/2004 | Richardson | E04D 3/08 52/395 |
| 7,059,577 B1 | 6/2006 | Burgett | |
| 7,225,590 B1 | 6/2007 | diGirolamo et al. | |
| 7,415,803 B2 | 8/2008 | Bronner | |
| D614,941 S | 5/2010 | Murphy | |
| 7,818,935 B2 | 10/2010 | Velickovic | |
| 7,845,120 B2 * | 12/2010 | Thome et al. | 52/144 |
| 8,555,595 B2 | 10/2013 | Hatzinikolas | |
| 8,567,145 B1 | 10/2013 | Chauncey | |
| 8,646,237 B1 * | 2/2014 | Takagi | 52/464 |
| 9,010,064 B1 | 4/2015 | Farahmandpour | |
| 2003/0070379 A1 | 4/2003 | Worley | |
| 2006/0179762 A1 * | 8/2006 | Thome | E04B 1/8409 52/506.01 |
| 2006/0185319 A1 | 8/2006 | Kufner et al. | |
| 2007/0227086 A1 | 10/2007 | Beavers et al. | |
| 2008/0115439 A1 | 5/2008 | Tamlyn | |
| 2008/0184538 A1 | 8/2008 | Shellnutt | |
| 2010/0263304 A1 * | 10/2010 | Torrents I Comas | E04F 21/0092 52/126.5 |
| 2012/0085066 A1 | 4/2012 | Kufner et al. | |
| 2012/0317909 A1 | 12/2012 | MacKenzie | |
| 2013/0333163 A1 | 12/2013 | Chen | |

* cited by examiner

FAÇADE WALL ATTACHMENT DEVICE

FIELD OF THE INVENTION

This invention relates in general to devices for connecting a façade wall to a support wall.

BACKGROUND OF THE INVENTION

The use of continuous insulation is mandated for some climates in the United States by newer energy codes, such as 2012 International Energy Conservation Code (IECC) and 2012 International Green Construction Code. The purpose of continuous insulation is to eliminate thermal breaks that reduce thermal efficiency of insulation placed between framing members such as wall studs.

Exterior paneling can be placed over rigid insulation boards or foam that are placed outside of an air barrier (AB)/weather-resistive barrier (WRB). The use of continuous insulation with paneling requires the paneling to be connected to the to the support or back-up wall behind the AB/WRB. Some ties that pass through the continuous insulation and result in thermal leaks that reduce the efficiency of the continuous insulation.

The present inventor recognized the need for a paneling attachment device that reduces thermal bridging where the continuous insulation is traversed. The present inventor recognized the need for a paneling attachment device that is less susceptible to deterioration by moisture and weather conditions.

When installing continuous insulation panels, the panels are often installed in complete contact with the AB/WRB on the back-up surface. This prevents proper drainage of water on the exterior face of the AB/WRB. Water can be trapped in the gap between the continuous insulation and AB/WRB due to capillary action. This trapped water can cause accelerated deterioration of ties and other components.

The present inventor recognized the need for a paneling attachment device that creates a gap between the continuous insulation panels and AB/WRB. This gap facilitates drainage.

Continuous insulation panels are often installed with adhesive backing to ensure they stay in place. This adhesive backing can impede drainage of water on the drainage plane and can degrade and fail over time under certain circumstances. This adhesive backing will also results in additional labor and material costs.

The present inventor recognized the need for a paneling attachment device that can retain the continuous insulation panels in place and eliminate the need to rely on adhesive backing.

The present inventor recognized the need to transfer some compressive force from the paneling attachment device onto the insulation to reduce or eliminate the possibility of buckling under compressive loads and to reduce the effective span within the cavity.

SUMMARY OF THE INVENTION

A facade attachment device for connecting an exterior façade wall to a backup wall is disclosed. The device has a base and a retainer. The base has an elongated member extending transversely from a mounting plate. The elongated member has a plurality of teeth. The mounting plate is configured to connect with the backup wall.

The retainer has an insulation engaging portion, a facade attachment portion, and a receiving passage. The receiving passage is sized to receive the elongated member. The receiving passage extends through the insulation engaging portion. The retainer has a ratcheting mechanism. The ratcheting mechanism comprises a locking member engageable with at least one of the plurality of teeth of the elongated member to prevent retainer from moving in at least one direction. The façade attachment portion is configured to receive a connection with the façade wall. An insulation space is formed between insulation engaging portion and the mounting plate when the retainer is connected to the elongated member.

In some embodiments, the façade wall is a panel wall. In some embodiments, the façade wall is a wall comprises stucco.

A method of connecting a façade wall to a backup wall is disclosed. A base is secured to the backup wall. The base has a back plate and an elongated member extending from the back plate. The elongated member comprises a plurality of teeth. Insulation panels are placed over at least a portion of the back plate. A ratcheting arm of a retainer is engaged with at least a portion of the plurality of teeth by sliding the retainer onto the elongated member and locking the retaining plate against an insulation panel. The façade wall is connected to an engaging plate face of the retainer.

Numerous other advantages and features of the present invention will become readily apparent from the following detailed description of the invention and the embodiments thereof, from the claims, and from the accompanying drawings.

DETAILED DESCRIPTION

The following description is presented to enable any person skilled in the art to make and use the invention. For the purposes of explanation, specific nomenclature is set forth to provide a plural understanding of the present invention. While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 1:
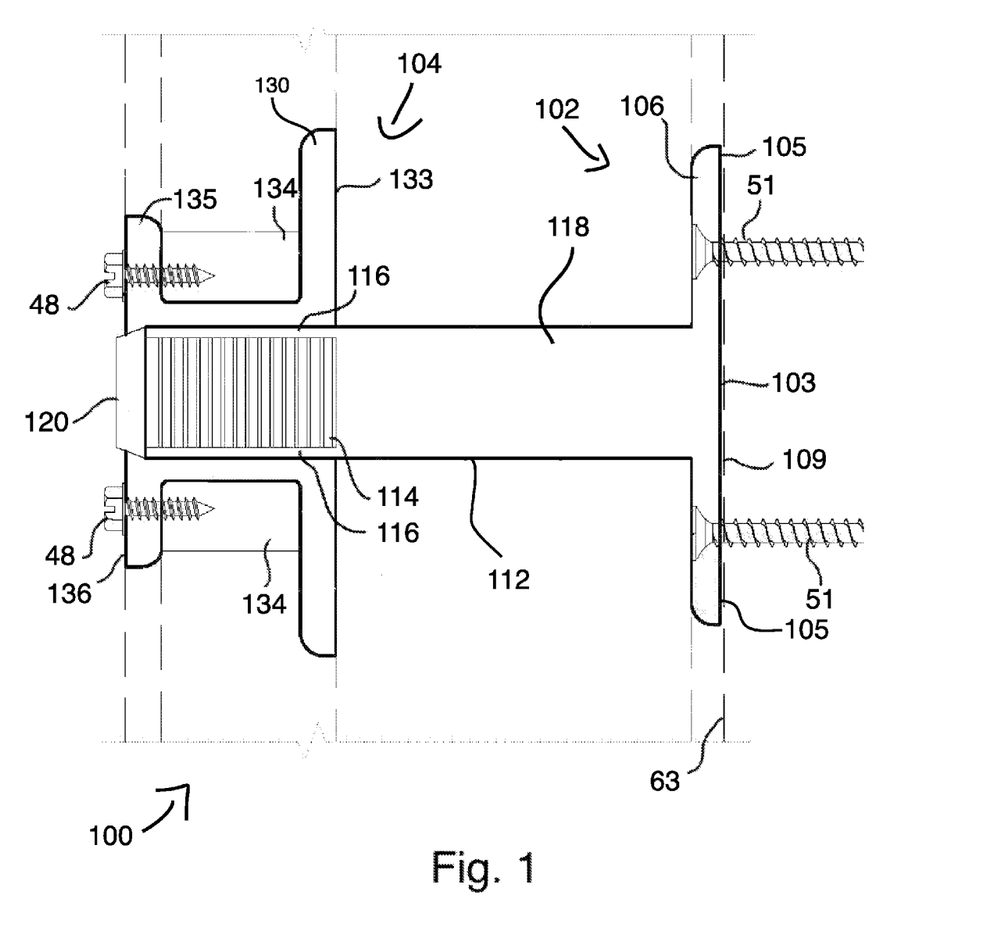
FIG. 1 is a side sectional view of a wall tie of the invention.
Figure 2:
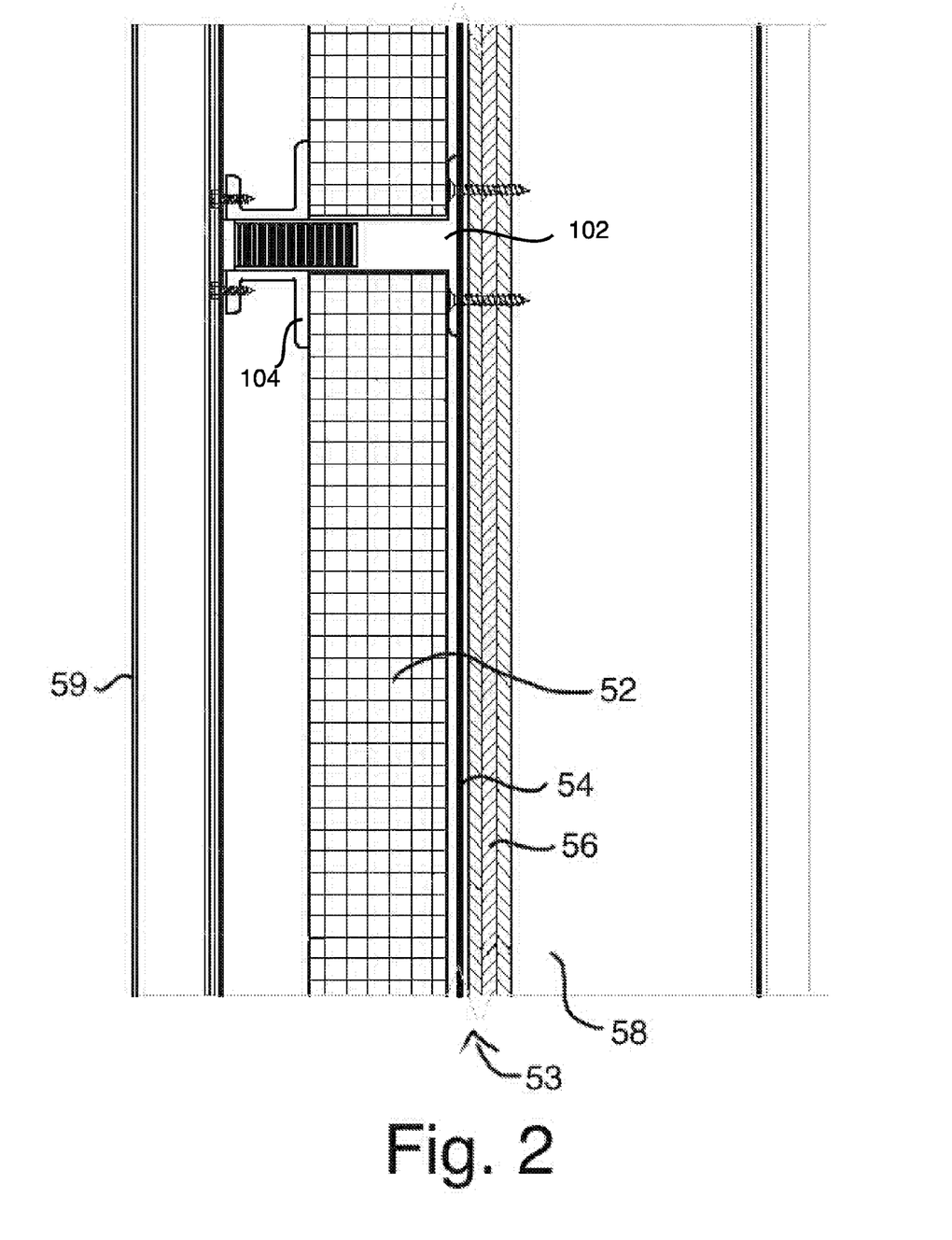
FIG. 2 is a side sectional view of the wall tie of FIG. 1 deployed in one type of application.

FIGS. 1-7 show a façade wall attachment device or a wall tie 100. The wall tie comprises a base 102 and a retainer 104. In some embodiments, both components are manufactured using a semi-rigid plastic material. FIG. 2 shows the wall tie deployed in one type of application connecting a façade wall to a backup wall. The base is attached to a backup wall 53. In some embodiments, the backup wall 53 may have an air barrier (AB) and/or weather-resistant barrier (WRB) 54, placed over an exterior wall board or sheathing 56, placed over wall studs 58. In some applications, the base may be attached over the air barrier and/or weather-resistant barrier 54. The base may be used on other walls or backup wall arrangements known in the art.

Figure 4:
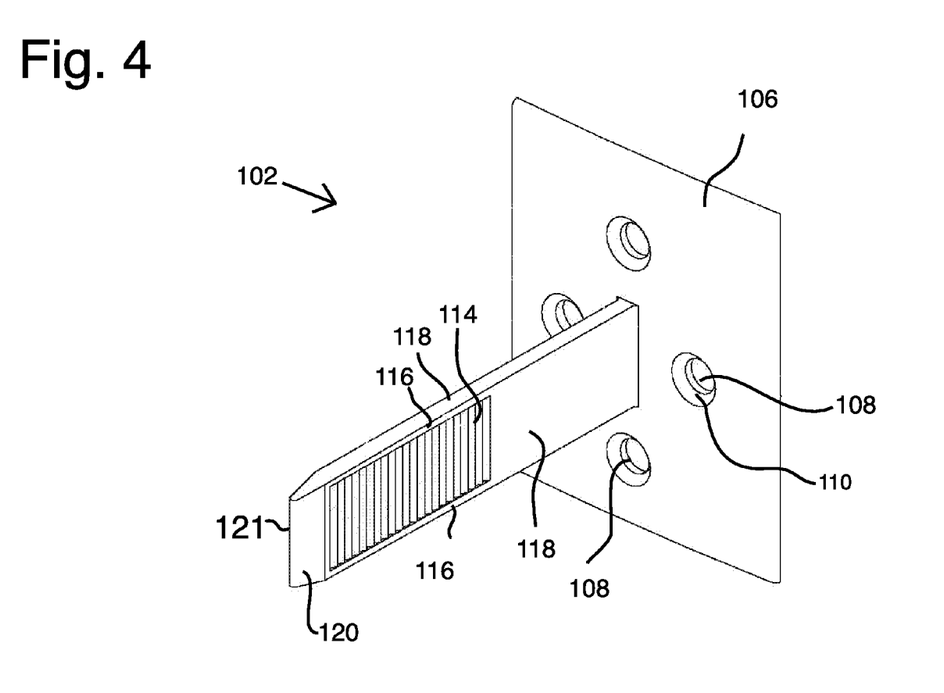
FIG. 4 is a perspective view of a base of the wall tie of FIG. 1.

The base 102 has a back plate 106 and a shaft 112 extending from the back plate. In some embodiments, the shaft extends perpendicular from the back plate. The shaft 112 has a blank portion 118, a toothed section 114, and an end portion 120. The blank portion 118 is adjacent the back plate 106.

Adjacent the blank portion 118 opposite the back plate is the toothed section 114. The length of the blank portion 118 may depend on the desire thickness of the insulation panels 52 of a given application. The toothed section 114 has a plurality of shaft teeth 113 adjacent recesses 113c. On opposite lateral sides of the toothed section 114 are shoulders 116. The shoulders 116 provide improved rigidity in the vertical direction and resistance against buckling under compressive load. In addition the shoulders 116 assist in alignment when the shaft is inserted in a receiving passage 142 of the retainer.

Figure 5:
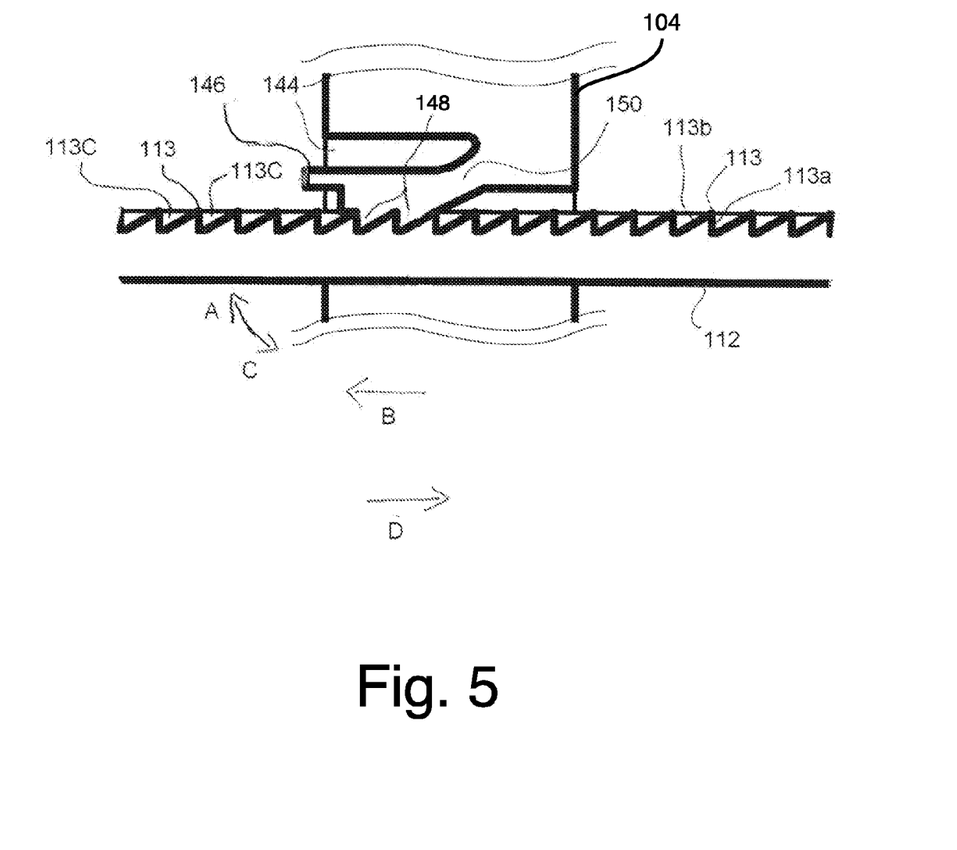
FIG. 5 is a partial side sectional view of the retainer and a shaft of the base of the wall tie of FIG. 1.

The teeth 113 comprise a vertical raised portion 113a intersecting an angled second portion 113b to form a peek as can best be seen from FIG. 5. In some embodiments the toothed portion comprises anywhere between 40% and 80% or more of the length of the shaft.

Adjacent the toothed portion 114 opposite the blank portion 118 on the shaft is the end portion 120. The end portion 120 may be tapered along its length from the toothed section to the end 121. The tapered arrangement allows for easier installation into the receiving passage 142 of the retainer. The end portion 120 comprises a taper on opposite sides that meets at the end 121 that is a rounded end.

The back plate 106 comprises one or more fastening apertures 108. Multiple fastening apertures allow for increased variably in alignment with studs in the backup wall. The fastening apertures may comprise countersunk recesses 110 as shown in FIG. 4. In one embodiment, the apertures are spaced apart equally about the shaft as shown in FIG. 4. Screws 51 or other fasteners may be inserted into and through the fastening apertures to secure the base to an exterior surface, such as the backup wall 53. The head of the fastener will contact the countersunk recess. The base may comprise an amount of pre-applied mastic or sealant at the fastening apertures to help seal the air barrier and/or weather-resistant barrier 54 at the point of fastener penetration. Fastener apertures may be located in other locations other than those shown in FIG. 4 and may be provided in more or less than four apertures as shown.

Figure 1A:
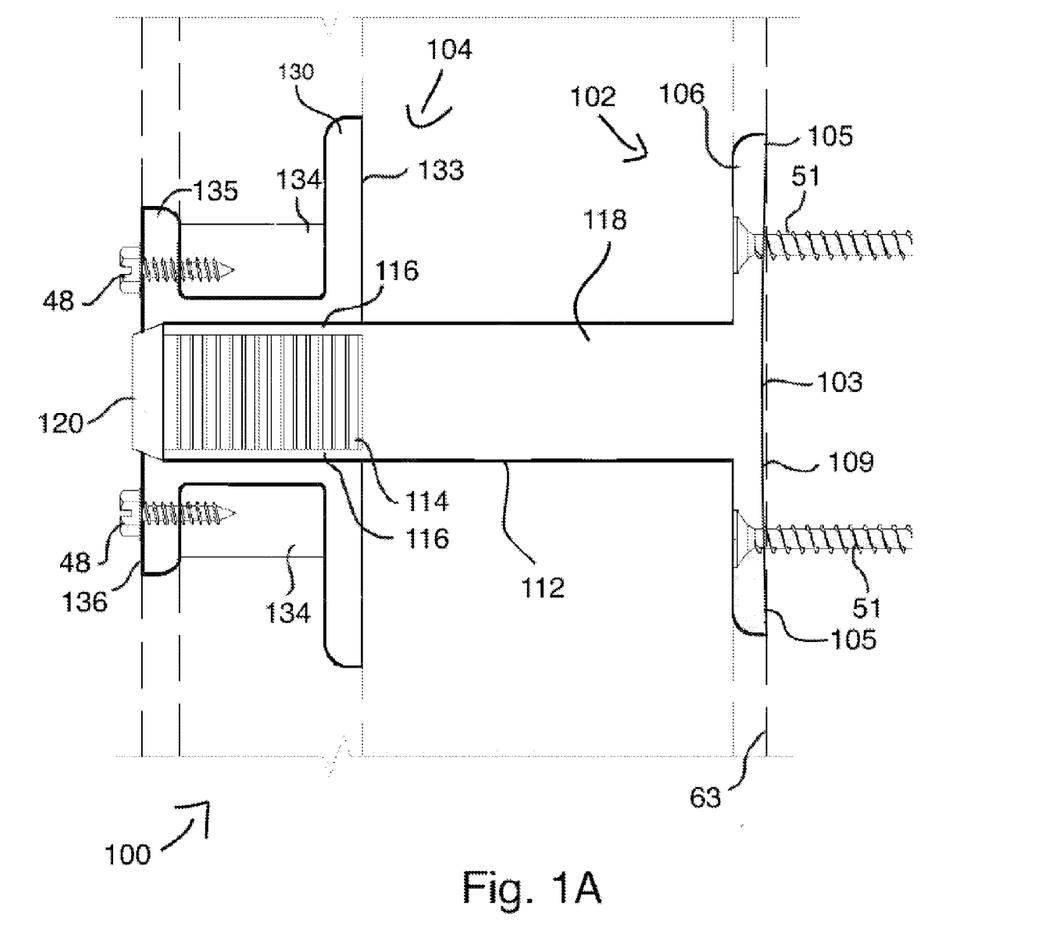
FIG. 1A is a side sectional view of a second embodiment wall tie of the invention having a back plate with a concave back surface.

In some embodiments, the back plate has a concave back surface 109, a shown in FIG. 1A. The concave arrangement provides that the entire perimeter 105, from the top, bottom, left, and right edges, of the back surface 109 are located closer to the straight plane 63, such as might be provided by the backup wall 53, as compared to a center 103. Therefore, the back plate is continuously curved from the perimeter to the center 103. The back surface 109 is slightly concave. The concave or cupped arrangement provides for a more uniform pressure on the back-up wall surface when fastened to the backup wall 53. This occurs because the pressure of the screws drawing the back plate against the backup wall surface causes the concave back surface 109 to flex and flatten against the backup wall surface. This can result in a more uniform pressure applied across the external surface, such as the backup wall surface, from the back plate. Although not shown, the back surface 133 of the retainer 104, the surface intended to be installed against the rigid insulation panels, can be concave in the same manner as just described regarding surface 109 of the back plate to provide for uniform compressive pressure against the rigid continuous insulation panels 52. Therefore, when the retainer is locked against the insulation panel(s), the central location of the receiving opening 142 and locking arm 146 lock the back plate against the backup wall surface causing the concave back surface of the retainer to flex and flatten against the insulation panel if sufficient force is applied to the retainer. This arrangement better distributes the load across the insulation panel in the area where the retainer contacts the insulation panel and reduces the chance that the insulation panel will be indented or crushed by the pressure applied to the retainer.

Figure 3:
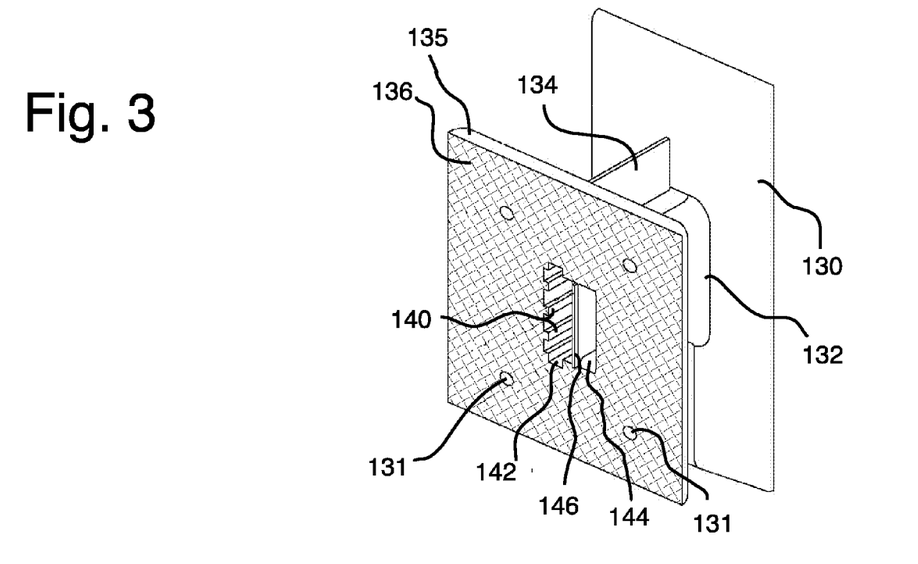
FIG. 3 is a perspective view of a retainer of the wall tie of FIG. 1.

The retainer 104 comprises a rear plate 130, a front plate 135, and a middle portion 132. The rear plate is connected to the front plate by the middle portion. Support plates 134 are attached on opposite sides of the middle portion and connect to the front and back plates to provide additional structural support to the retainer 104. The rear plate 130 comprises a back surface 133 configured to contact or be in close proximity to insulation 52 to secure the insulation in place. The front plate 135 comprises a front face 136. The front face is configured to receive contact from a façade wall, such a panel wall or an exterior panel 59. The exterior panel can be a part of a panel system. The exterior panel may comprise metal, plastic, vinyl, or other known materials for exterior paneling. The exterior panel 59 can be secured to the front face 136 by fasteners, such as screws 48. The screws are received in threaded fastener apertures 131 located in the front face. The front face 136 may comprises a textured surface to frictionally engage the panel 59. The texture may comprise corrugations, grooves, and/or ridges, among other surface treatments to provide a textured surface.

In some embodiments, as shown in FIG. 1, the height of the front plate 135 is less than the height of the rear plate 130. The back plate has a height that is greater than the height of the front plate 135 and less than the height of the rear plate 130.

The front face 136 has a receiving passage 142. As shown in FIG. 1, the receiving passage extends through the front plate, through the middle portion, and through the back surface 133 of the rear plate 130. The receiving passage is configured, as shown in FIG. 1, to receive the shaft 112 there through. Adjacent the receiving passage 142 is a locking arm 146 with locking arm teeth 148 which together with the shaft teeth create a ratcheting mechanism to secure the retainer against movement in the direction B of FIG. 5. The locking arm can be provided with one, two, or more than two locking arm teeth 148.

The locking arm 146 is biased to extend into the receiving passage 142 in the direction C of FIG. 5. When the shaft 112 is inserted into the receiving passage 142 at least the teeth 148 engage with the shaft and the shaft drives the locking arm 146 about pivot location 150 in the direction A. The locking arm comprises the downward extending locking arm teeth 148. The locking arm teeth 148 engage with the shaft teeth 113. The engagement between the teeth 148 and teeth 113 prevents the retainer 104 from moving away from the base in the direction B shown in FIG. 5.

The locking arm teeth 148 can be disengaged from the shaft teeth 113 by pulling the locking arm 148 upward in the direction A of FIG. 5 into an upper area 144. When the locking arm teeth 148 are disengaged from the shaft teeth 113, the retainer can be removed in the direction B.

The locking arm 146 does not need to be raised, to disengage the locking arm teeth 148 from the shaft teeth 113, in order to allow the retainer 104 to move in direction D relative to the shaft. When the retainer 104 is moved in direction D relative to the shaft 112, angled portions of the teeth 148 will slide along the angled second portions 113b of the shaft teeth 113 from one tooth to the next until the retainer is no longer moved in direction D or the retainer meets an exterior surface, such as continuous insulation panels 52. In this way, the retainer can secure the continuous insulation panels 52 against the backup wall 53 at least until the locking arm is moved in the direction A to release the locking arm teeth 148 from the shaft teeth 113. Therefore the locking arm 146 has a raised position in the direction A where the locking arm teeth 148 are disengaged from the shaft teeth 113 so that the retainer can move in direction B. The locking arm 146 has a lowered or engaged position where the locking arm teeth 148 are engaged with the shaft teeth 113 so that the retainer is prevented from moving in the direction B.

The retainer is capable of securing the insulation in place. In addition, the retainer also transfers a portion of the compressive force from the panels 59, under positive wind or other loads, to the insulation panels 52 via the panels 59 connection with the front face 136. Such load may also be transferred from the insulation panels to the backup wall 53.

Figure 6:
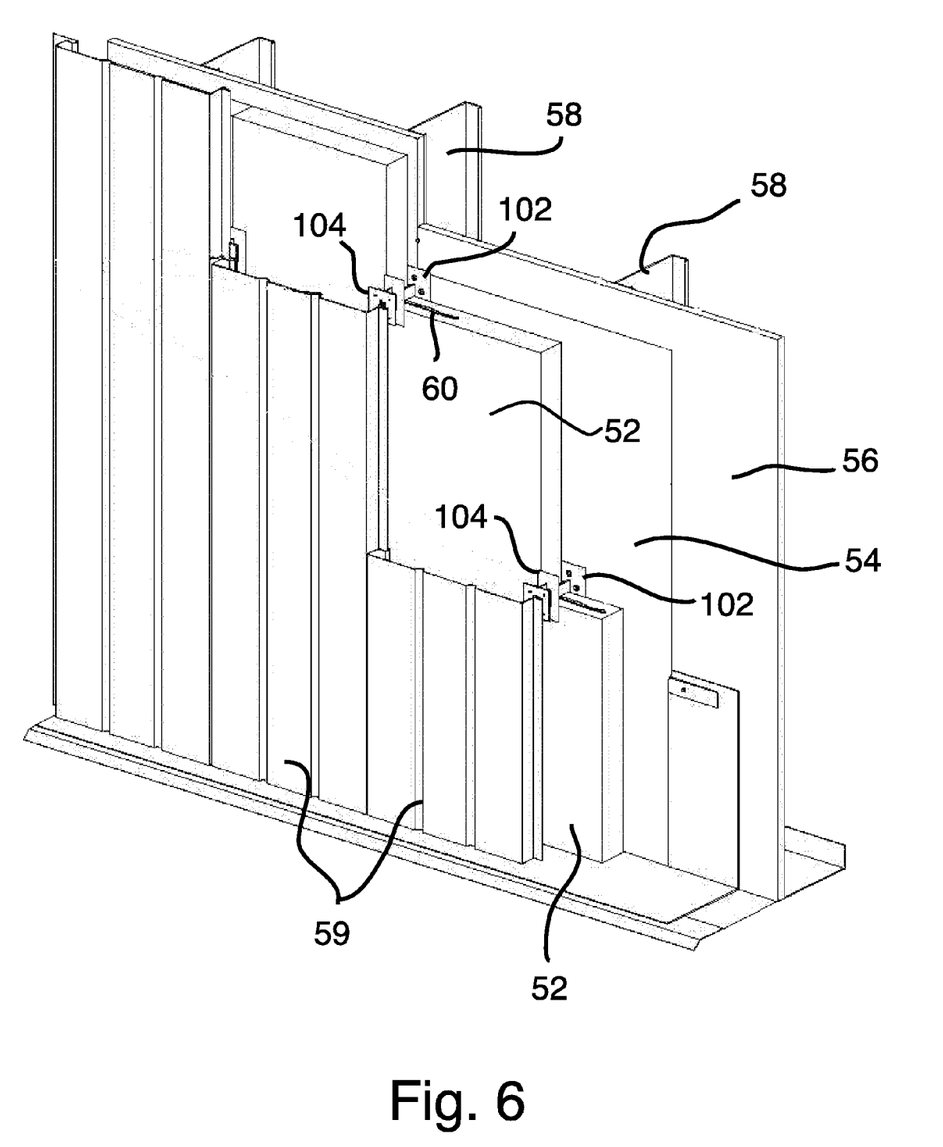
FIG. 6 is a perspective front view a plurality of wall ties deployed in the application of FIG. 2.
Figure 7:
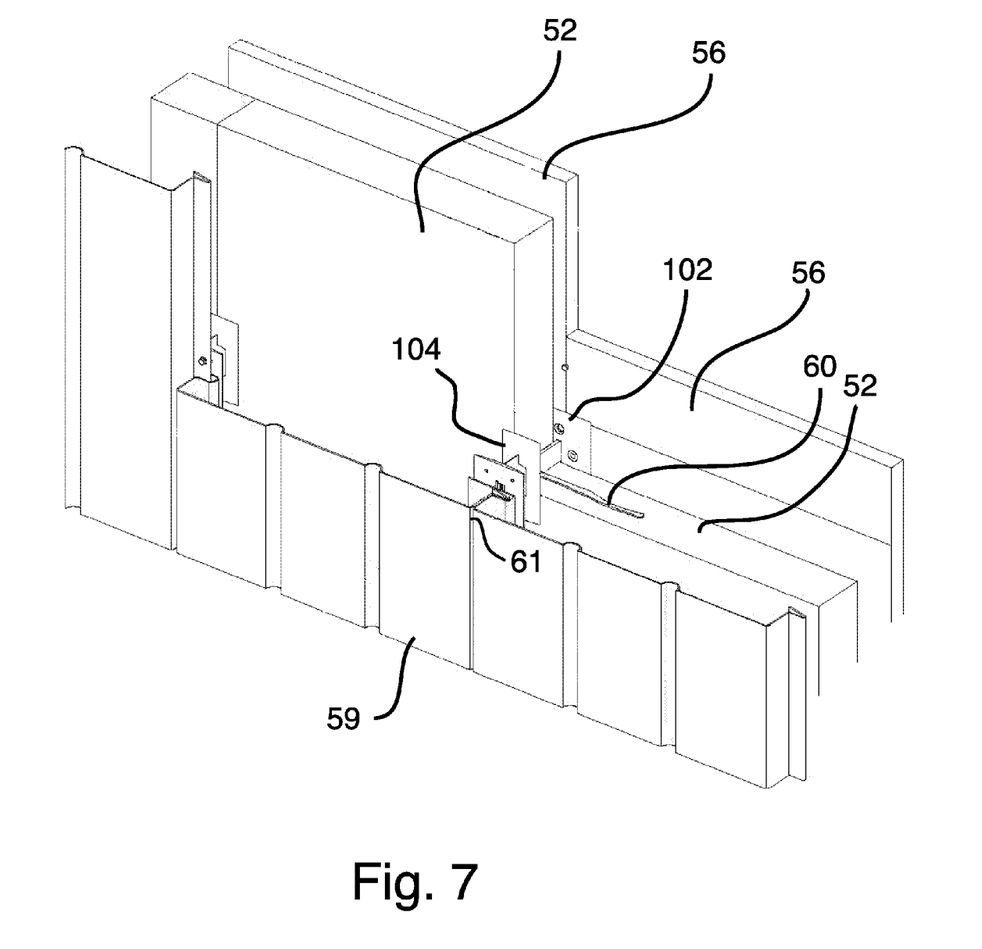
FIG. 7 is an enlarged perspective view of a plurality of wall ties in the application taken from FIG. 6.

FIGS. 6 and 7 show one application where the wall tie 100 can be used. After the base(s) 102 is installed on the backup wall, insulation panels 52 can be installed between the shafts 112 of the spaced apart bases, or each row of ties can be installed after setting the underlying row of insulation panels 52. The base can be installed after the AB/WRB is installed on the backup wall. Under other methods, the bases 102 can be installed concurrently with the insulation panels 52. The insulation panels 52 are then held in place by pushing the retainer 104 on the corresponding shaft 112 of the base until the back surface 133 of the retainer 104 is in contact with the insulation panel 52. The locking arm 146 engages the shaft in a ratcheting action. The back side of the insulation panels 52 rest against the back plate 106 of the base 102 providing for proper alignment and a small gap between the insulation panel 52 and the backup wall for drainage. In some applications, a bead of sealant 60, such as polyurethane or silicone sealant can be applied to the top and/or bottom wall of the insulation panels 52 as shown in FIGS. 6 and 7 to seal between adjacent panels and around the shaft 112 of the base.

The base 102 can be positioned on the backup wall so that the corresponding shaft 112 will be located at a panel joint 61 or seam. Then, the panel(s) 59 can be attached to the front face 136 of the retainer 104 with fasteners 48.

In some applications, the end, such as the end portion 120 and/or including portions of the toothed section 114 of the shaft 112 can be cut off or trimmed back so that the shaft 112 does not extend beyond the front face 136 of the retainer 104, or so that the shaft does not extend so far as to interfere with the flush mounting of the panel 59 to the front face when installed.

In some embodiments, the tie is formed of plastic. Plastic will not corrode and is less susceptible to moisture and weather related damage. In some embodiments, at least the shaft is formed of plastic which has some elasticity allowing differential movements between the backup wall and the panels 59. Further plastic is a better insulator as compared with steel and will lessen or eliminate any thermal transfer at the tie.

In some embodiments, the shaft has a thickness of 3 mm or less, which results in lower rigidity as compared to conventional metal ties. The reduced thickness reduces the gap between adjacent insulation panels and therefore requires less sealant to fill the gap.

Figure 8:
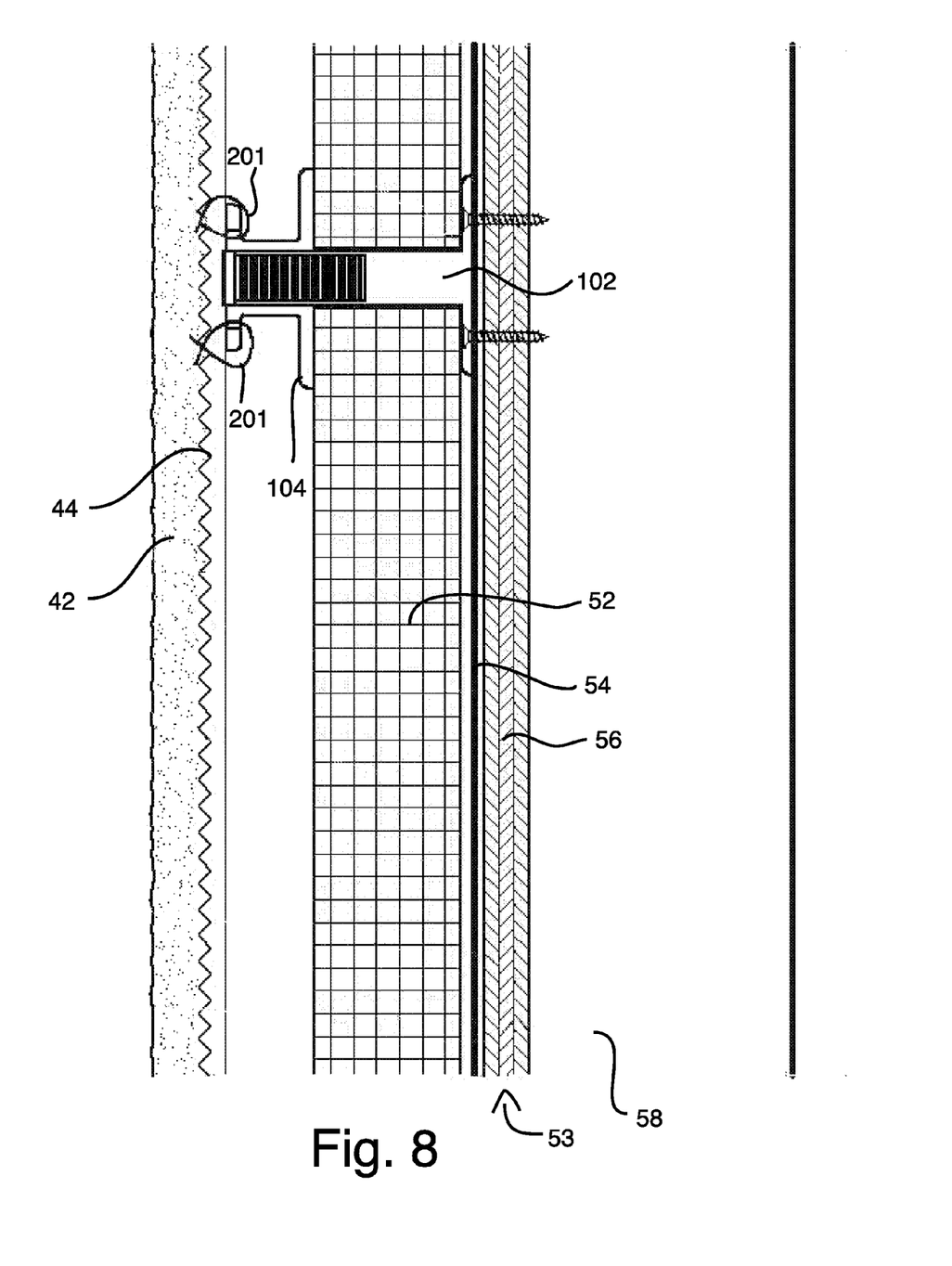
FIG. 8 is a side section view of the wall tie of FIG. 1 deployed in a second type of application.
Figure 9:
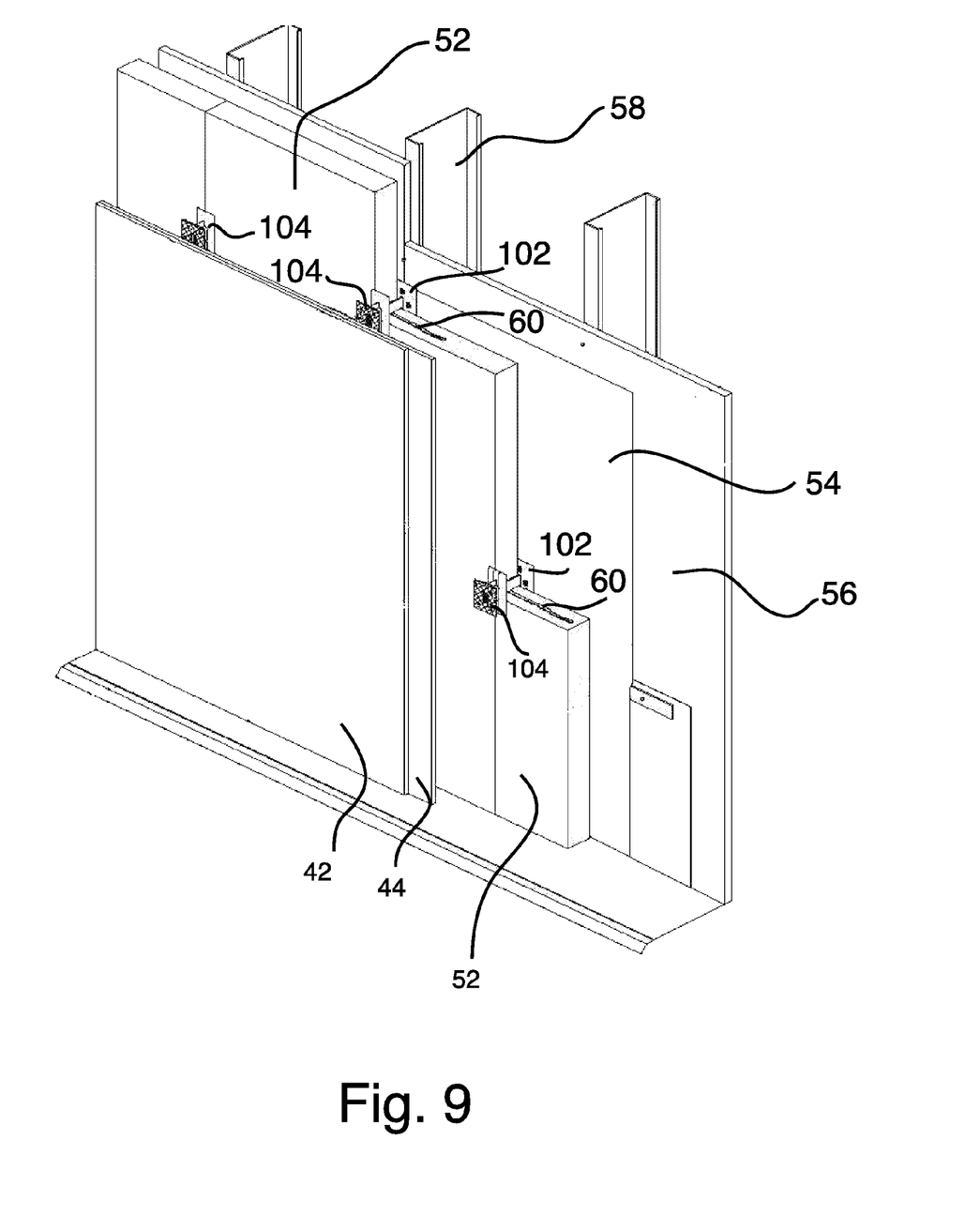
FIG. 9 is a perspective front view a plurality of wall ties deployed in the application of FIG. 8.
Figure 10:
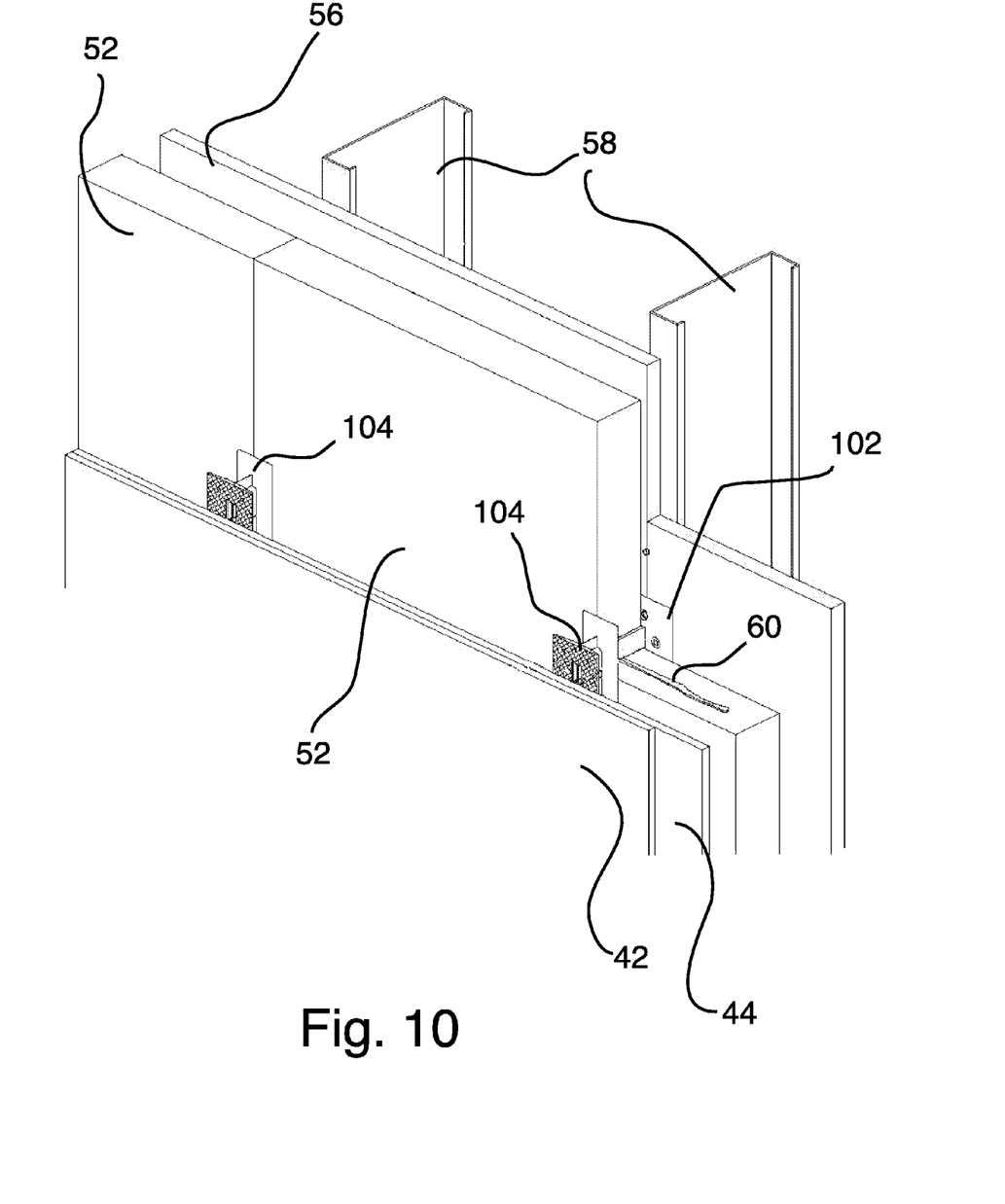
FIG. 10 is an enlarged perspective view of a plurality of wall ties in the application taken from FIG. 9.

FIGS. 8 through 10 show the wall tie 100 deployed in a second application involving a stucco wall. The wall tie 100 is attached to the backup wall 53, and the insulation panels 52 and retainer are deployed in the same manner as described in regards to FIG. 2. A lath 44 which supports the stucco material 42 is placed against the front face 136 of the retainer. Wires 201 are threaded through one or more of the apertures 131 in the front face 136 of the retainer and through apertures (not shown) in the lath 44. The wires 201 are then tightened to draw the lath into surface-to-surface contact with the front face 136 so that the lath is secured thereto. Then the stucco material is applied to the lath. The wires may be plastic or metal or other material having a strength sufficient to secure the stucco wall to the retainer.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A paneling attachment device for connecting panel cladding to a vertical support wall, comprising:
   a base comprising a shaft and a back plate, the shaft comprising a plurality of shaft teeth, the shaft extending transversely from the back plate, the shaft is permanently connected to the back plate, the back plate is attachable to the support wall; and,
   a retainer comprising a panel connection plate, an insulation contact plate, a connecting portion, a receiving channel, and a locking arm,
   the panel connection plate is spaced apart from the insulation contact plate, the connecting portion extends between the panel connection plate and the insulation contact plate, the receiving channel comprising a receiving entrance on the insulation contact plate, the receiving channel extending transversely through the insulation contact plate and is configured to receive the shaft, the locking arm is adjacent the receiving channel, the locking arm is biased to a locked position where the locking arm engages at least one of the plurality of shaft teeth when the at least one of the plurality of shaft teeth is adjacent the locking arm to prevent the retainer from moving in a first direction opposite the back plate,
   the panel connection plate is opposite the insulation contact plate, the panel connection plate is flat, the panel connection plate is larger than the receiving entrance, the panel connection plate configured to receive a connection with the panel cladding,
   the insulation contact plate is spaced apart from the back plate to form an insulation space.

2. The device of claim 1, wherein the locking arm comprises a released position, and the locking arm comprises a handle portion, the handle portion enables a user to move the locking arm between the locked position and the released position, the retainer movable relative to the shaft in a second direction opposite the first direction when the locking arm is in the released position.

3. The device of claim 1, wherein the locking arm comprises a released position, the locking arm is released from the plurality of shaft teeth and the retainer is free to move in the first direction and in a second direction opposite the first direction along the shaft when the locking arm is in the released position.

4. The device of claim 1, wherein the locking arm comprises a plurality of locking arm teeth that engage with the plurality of shaft teeth to prevent the retainer from moving in the first direction.

5. The device of claim 1, wherein the back plate comprises one or more fastening apertures for receiving one or more fasteners to connect the back plate to the support wall, and a back surface of the back plate is concave.

6. The device of claim 1, wherein the receiving channel extends from the receiving entrance on the insulation contact plate through the panel connection plate, the panel connection plate comprises apertures for receiving fasteners to hold the panel cladding against the panel connection plate.

7. The device of claim 1, wherein the panel connection plate is parallel to the insulation contact plate of the retainer.

8. The device of claim 1, the shaft is perpendicular to the back plate and the insulation contact plate of the retainer.

9. A facade attachment device for connecting an exterior façade wall to a backup wall, comprising:
   a base comprising an elongated member and a mounting plate, the elongated member comprising a plurality of teeth, the elongated member extending transversely from the mounting plate, the elongated member is permanently connected to the mounting plate, the mounting plate configured to connect with the backup wall; and,
   a retainer comprising an insulation engaging plate, a facade connection plate, a connecting portion, a ratcheting mechanism, and a receiving passage sized to receive the elongated member,
   the façade connection plate providing a façade connection side to the retainer, the connecting portion extending between the façade connection plate and the insulation engaging plate, the façade connection plate is spaced apart from the insulation engaging plate, the receiving passage comprising a receiving entrance on the insulation engaging plate, the receiving passage extending through the insulation engaging plate, the ratcheting mechanism comprises a locking member biased to engage with at least one of the plurality of teeth to prevent the retainer from moving in at least one direction away from the mounting plate;
   the facade connection side is projection-free, the facade connection plate is opposite the insulation engaging plate, the façade connection side is larger than the receiving entrance, the façade connection plate configured to receive a connection with the exterior facade wall,
   an insulation space is formed between the insulation engaging plate and the mounting plate.

10. The device of claim 9, wherein the locking member is releasably biased toward engagement with at least one of the plurality of teeth of the elongated member.

11. The device of claim 9, wherein the locking member comprises a released position and an engaged position, the locking member is engaged with at least one of the plurality of teeth when the at least one of the plurality of teeth is adjacent the locking member to prevent the retainer from moving in the at least one direction when in the engaged position, and the locking member is released from the plurality of teeth and the retainer is free to move in two directions along the elongated member when the locking member is in the released position; and the locking member comprises a handle portion, the handle portion enables a user to move the locking member between the engaged position and the released position.

12. The device of claim 9, wherein the locking member comprises a plurality of locking member teeth that engage with the plurality of teeth of the elongated member to prevent the retainer from moving in the at least one direction.

13. The device of claim 9, wherein the mounting plate is substantially parallel to the insulation engaging plate and the façade connection side.

14. The device of claim 9, wherein the insulation engaging plate comprises a size that is greater than a size of the façade connection side.

15. The device of claim 1, wherein the panel connection plate is parallel to the back plate and parallel to the insulation contact plate of the retainer, the shaft is perpendicular to the back plate and the insulation contact plate; and the back plate comprises a front surface, the front surface is flat, and the insulation contact plate comprises a flat insulation contact surface.

16. The device of claim 1, wherein
   each of the plurality of shaft teeth comprise a shaft vertical portion and a shaft angled portion, the shaft angled portion intersects with the shaft vertical portion at a valley between adjacent shaft teeth of the plurality of shaft teeth, the shaft vertical portion is perpendicular to a length of the shaft extending from the back plate, the angled portion forms an acute angle at an intersection with the vertical portion; and,
   wherein the locking arm comprises a plurality of locking arm teeth, each of the plurality of locking arm teeth comprise a locking arm vertical portion and a locking arm angled portion, the locking arm angled portion intersects with the locking arm vertical portion at a valley between adjacent locking arm teeth of the plurality of locking arm teeth that engage with the plurality of shaft teeth, the locking arm vertical portion is perpendicular to the receiving channel, the locking arm angled portion forms an acute angle at an intersection with the locking arm vertical portion; and,
   when the vertical portion of shaft teeth contact the locking arm vertical portion of the locking arm teeth the retainer is prevented from moving in the first direction, a contact between the shaft angled portion of the shaft teeth and the locking arm angled portion of the locking arm teeth allows the locking arm teeth to slide along the shaft in a second direction opposite the first direction when the locking arm is in the locked position.

17. A facade attachment device for connecting a façade wall to a vertical support wall, comprising:
   a base comprising a shaft extending transverse from a back plate, the shaft comprising a plurality of shaft teeth, the shaft is permanently connected to the back plate, the back plate attachable to the vertical support wall;
   a retainer comprising a façade connection plate, an insulation contact plate, a connecting portion, a receiving channel, and a locking arm,
   the connecting portion extending between the façade connection plate and the insulation contact plate, the façade connection plate is spaced apart from the insulation contact plate, the receiving channel comprising a receiving entrance on the insulation contact plate, the receiving channel extending transversely through the insulation contact plate and configured to receive the shaft, the locking arm is adjacent the receiving channel, the locking arm is biased to a locked position where the locking arm engages at least one of the plurality of shaft teeth when the at least one of the plurality of shaft teeth is adjacent the locking arm to prevent the retainer from moving in a first direction opposite the back plate, the facade connection plate is opposite the insulation contact plate, the facade connection plate is larger than the receiving entrance, the facade connection plate is flat, the facade connection plate configured to receive a connection with the facade wall, the insulation contact plate is spaced apart from the back plate to form an insulation space.

18. The device of claim 9, wherein the retainer comprises a plurality of support wings, at least one of the plurality of support wings are connected to the connecting portion on opposite sides of the connecting portion, the plurality of support wings connect the façade connection plate to the insulation engaging plate.

19. The device of claim 1, the receiving channel extends at least from the insulation contact plate into the connecting portion.

20. The device of claim 1, wherein the retainer comprises a plurality of support wings, at least one of the plurality of support wings are connected to the connecting portion on opposite sides of the connecting portion, the plurality of support wings connect the panel connection plate to the insulation contact plate.

\* \* \* \* \*